(12) United States Patent
Vandoros

(10) Patent No.: US 11,064,255 B2
(45) Date of Patent: Jul. 13, 2021

(54) SYSTEM AND METHOD OF TABLET-BASED DISTRIBUTION OF DIGITAL MEDIA CONTENT

(71) Applicant: OOHMS NY LLC, New York, NY (US)

(72) Inventor: Alexander Vandoros, New York, NY (US)

(73) Assignee: OOHMS NY LLC, New York, NY (US)

( * ) Notice: Subject to any disclaimer, the term of this patent is extended or adjusted under 35 U.S.C. 154(b) by 0 days.

(21) Appl. No.: 16/262,255

(22) Filed: Jan. 30, 2019

(65) Prior Publication Data

US 2020/0245031 A1 Jul. 30, 2020

(51) Int. Cl.
| | |
|---|---|
| H04N 21/466 | (2011.01) |
| H04N 21/45 | (2011.01) |
| H04N 21/4223 | (2011.01) |
| H04N 21/414 | (2011.01) |

(52) U.S. Cl.
CPC ... H04N 21/4667 (2013.01); H04N 21/41407 (2013.01); H04N 21/4223 (2013.01); H04N 21/4524 (2013.01)

(58) Field of Classification Search
None
See application file for complete search history.

(56) References Cited

U.S. PATENT DOCUMENTS

| | | | |
|---|---|---|---|
| 8,108,886 B1 * | 1/2012 | Murahashi | H04N 21/44222 725/13 |
| 8,660,895 B1 | 2/2014 | Saurabh et al. | |
| 9,137,558 B2 * | 9/2015 | Gibbon | H04N 21/4661 |
| 9,363,464 B2 * | 6/2016 | Alexander | H04N 5/775 |
| 9,420,320 B2 * | 8/2016 | Doe | H04N 21/25841 |
| 9,967,618 B2 * | 5/2018 | Blong | H04L 51/32 |

(Continued)

FOREIGN PATENT DOCUMENTS

| | | | | |
|---|---|---|---|---|
| KR | 10-0824069 B1 | 4/2008 | | |
| WO | 2010/060146 A1 | 6/2010 | | |
| WO | WO-2014130594 A1 * | 8/2014 | | G06Q 30/08 |

OTHER PUBLICATIONS

Notification of Transmittal of the International Search Report (Form PCT/ISA/220 and PCT/ISA/210) and the Written Opinion of the International Searching Authority (Form PCT/ISA/237) issued on May 12, 2020, by the International Application Division Korean Intellectual Property Office in corresponding International Application No. PCT/US2020/014575. (11 pages).

*Primary Examiner* — An Son P Huynh

(74) *Attorney, Agent, or Firm* — Buchanan Ingersoll & Rooney PC

(57) ABSTRACT

A method for distributing media content and tracking viewer impressions in an out-of-home context includes: a mobile computing device receiving an identifier of a first media content item; causing display of the first media content item to a first viewer; sensing image data of the first viewer during display of the first media content item; determining a location of the mobile computing device during display of the first media content item to the first viewer; sending the image data of the first viewer, and an impression-reporting message including: the identifier of the first media content item and the location of the mobile computing device during display of the first media content item to the first viewer.

20 Claims, 9 Drawing Sheets

(56) References Cited

U.S. PATENT DOCUMENTS

| | | | |
|---|---|---|---|
| 9,973,819 B1* | 5/2018 | Taylor | H04N 7/17318 |
| 10,021,458 B1* | 7/2018 | Taylor | H04N 21/2187 |
| 10,194,189 B1* | 1/2019 | Goetz | H04N 21/4122 |
| 10,341,723 B2* | 7/2019 | Benedetto | H04N 21/44204 |
| 10,440,436 B1* | 10/2019 | Taylor | H04N 21/234345 |
| 2005/0289582 A1* | 12/2005 | Tavares | H04H 60/33 |
| | | | 725/10 |
| 2006/0184624 A1* | 8/2006 | Thukral | H04N 7/15 |
| | | | 709/204 |
| 2009/0133051 A1* | 5/2009 | Hildreth | H04N 21/4223 |
| | | | 725/28 |
| 2009/0138805 A1* | 5/2009 | Hildreth | H04N 21/64322 |
| | | | 715/745 |
| 2009/0138906 A1* | 5/2009 | Eide | G06Q 30/0264 |
| | | | 725/32 |
| 2009/0148124 A1* | 6/2009 | Athsani | G06Q 30/02 |
| | | | 386/241 |
| 2010/0120465 A1 | 5/2010 | Chung | |
| 2010/0262986 A1* | 10/2010 | Adimatyam | H04H 60/46 |
| | | | 725/9 |
| 2011/0069940 A1* | 3/2011 | Shimy | G11B 27/105 |
| | | | 386/296 |
| 2011/0078717 A1* | 3/2011 | Drummond | H04N 21/4788 |
| | | | 725/14 |
| 2011/0279311 A1* | 11/2011 | Hamano | G06F 16/29 |
| | | | 342/357.25 |
| 2012/0072939 A1 | 3/2012 | Crenshaw | |
| 2012/0090000 A1* | 4/2012 | Cohen | G11B 27/034 |
| | | | 725/32 |
| 2012/0154557 A1* | 6/2012 | Perez | H04N 21/47205 |
| | | | 348/53 |
| 2012/0278179 A1* | 11/2012 | Campbell | G06Q 30/0255 |
| | | | 705/14.69 |
| 2013/0076853 A1* | 3/2013 | Diao | H04N 7/157 |
| | | | 348/14.08 |
| 2013/0194177 A1* | 8/2013 | Sakata | H04N 21/44218 |
| | | | 345/156 |
| 2013/0205314 A1* | 8/2013 | Ramaswamy | H04N 21/44218 |
| | | | 725/14 |
| 2013/0298146 A1* | 11/2013 | Conrad | H04N 21/2668 |
| | | | 725/12 |
| 2013/0330055 A1* | 12/2013 | Zimmermann | G06F 16/78 |
| | | | 386/240 |
| 2014/0067828 A1* | 3/2014 | Archibong | G06F 17/30277 |
| | | | 707/748 |
| 2014/0078039 A1* | 3/2014 | Woods | H04N 21/442 |
| | | | 345/156 |
| 2014/0081954 A1* | 3/2014 | Elizarov | H04N 21/252 |
| | | | 707/722 |
| 2014/0168056 A1* | 6/2014 | Swaminathan | G06F 3/147 |
| | | | 345/156 |
| 2014/0215529 A1* | 7/2014 | Good | H04N 21/2542 |
| | | | 725/60 |
| 2014/0306974 A1 | 10/2014 | Vandoros | |
| 2015/0110471 A1* | 4/2015 | Zheng | H04N 5/76 |
| | | | 386/291 |
| 2015/0178915 A1* | 6/2015 | Chatterjee | G06F 16/58 |
| | | | 382/128 |
| 2015/0312607 A1* | 10/2015 | Walker | H04N 21/25891 |
| | | | 725/35 |
| 2016/0021412 A1* | 1/2016 | Zito, Jr. | H04N 21/44213 |
| | | | 725/13 |
| 2016/0037217 A1* | 2/2016 | Harmon | H04N 21/45457 |
| | | | 725/9 |
| 2016/0219332 A1 | 7/2016 | Asbun et al. | |
| 2016/0381427 A1* | 12/2016 | Taylor | G06Q 30/00 |
| | | | 725/13 |
| 2017/0006322 A1* | 1/2017 | Dury | H04N 21/254 |
| 2017/0094216 A1* | 3/2017 | Ekambaram | H04N 5/23218 |
| 2017/0127104 A1* | 5/2017 | Thomas | H04N 21/2543 |
| 2017/0264920 A1* | 9/2017 | Mickelsen | G06K 9/00335 |
| 2017/0295404 A1* | 10/2017 | Meredith | H04H 60/33 |
| 2018/0098133 A1* | 4/2018 | Liassides | H04N 21/25841 |
| 2018/0350144 A1* | 12/2018 | Rathod | G06Q 20/3276 |
| 2018/0367839 A1 | 12/2018 | Vandoros | |
| 2019/0147185 A1* | 5/2019 | Cai | G06F 21/6245 |
| | | | 726/30 |
| 2019/0200079 A1* | 6/2019 | Mathur | H04N 21/4667 |
| 2019/0238719 A1* | 8/2019 | Alameh | H04W 12/02 |
| 2019/0261061 A1* | 8/2019 | Liassides | G06Q 30/0241 |
| 2020/0059703 A1* | 2/2020 | Sonare | H04N 21/835 |

* cited by examiner

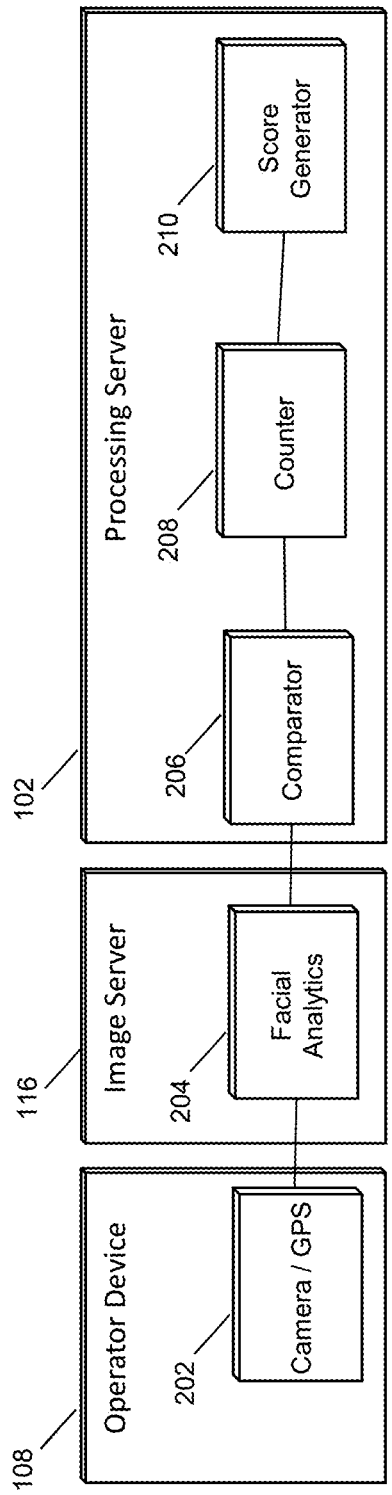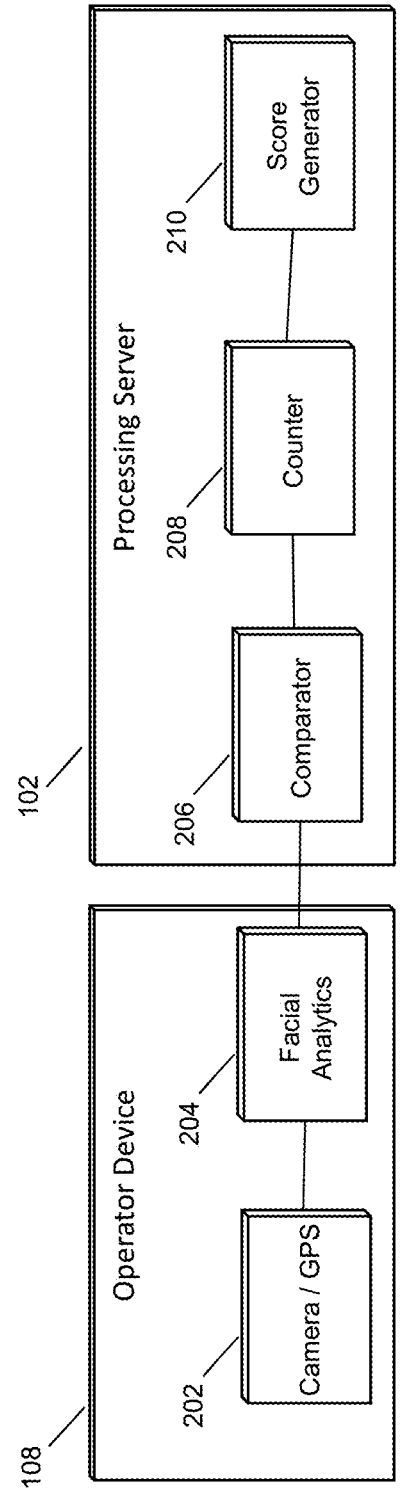
FIG. 2A
FIG. 2B

SYSTEM AND METHOD OF TABLET-BASED DISTRIBUTION OF DIGITAL MEDIA CONTENT

FIELD

The present disclosure relates to the distribution of audio and visual content to viewers in an out-of-home setting and tracking impressions of such viewers. Specifically, the present disclosures relates to systems and methods for exposing viewers to audio and/or visual content via a mobile device, tracking the impressions of the viewers, and providing impression scores.

BACKGROUND

Distribution of media content such as advertisements to users outside of the home have been traditionally limited to static printed media such as posters, billboards, etc. or, more recently, electronic visual displays such as electronic billboards and the like. While such displays often were able to have the possibility of reaching a large number of people, many people simply ignore the media content. Further, posters and traditional billboards are changed manually and require multiple steps of printing, distributing and placing, which is labor intensive, slow and inefficient. Electronic billboards do not have these particular technical challenges, but share with the more traditional methods the need for physical structures and cost of lighting systems and lighting energy. They are often restricted as to where the display can occur, by zoning laws and the like. Finally, unlike the online transactions where click-through actions and dwell time can be measured, there is no particular way to determine who or how many people actually pay attention to these forms of advertising, other than from visual observation such as disclosed in U.S. Pat. Pub. US 2018-0367839 and US 2014-0306974 by the current inventor, herein incorporated by reference, which discloses projected dynamic display systems. These are problems with the technology.

Some companies, in an effort to save resources and obtain the attention of viewers, have resorted to the use of distributing flyers to people. While such forms of content distributions can be effective in gaining the person's attention because of the human interaction, it is frequently subject to fraud when compensating the distributors of the fliers, particularly in that it lacks an ability to track the person distributing the flyers or the fliers themselves (e.g., they can be reported as distributed even though they might not be).

As can be seen from the above, these types of out of home advertising present technical problems (e.g., location restrictions, lack of mobility, environmental/ecological aspects with paper flyers littering streets, paper posters/stenciled "tags" defacing walls, inability to serve "fresh" content on short notice, inability to track impact in an automated fashion, exposure to fraud, etc.). Thus, there is a need for a technical solution to provide a practical system of distribution of media content and tracking viewer impressions in an out-of-home context while preventing fraud, and increasing impact in an environmentally sustainable fashion.

SUMMARY

An underlying principle of the disclosed system and method is the use of connected personal mobile devices such as e.g. iPads or Android tablets ("Operator Devices") with built-in screens and video cameras (carried and/or placed by "Operators") as addressable/programmable media displays in public space for distribution of messages, audio/visual art and ads while concurrently measuring audience engagement and providing proof of performance to "Users".

The present disclosure provides a description of systems and methods for exposing viewers to audio and visual content via a mobile device, tracking the impressions of the viewers, and providing impression scores. A method for distributing media content and tracking viewer impressions in an out-of-home context includes: receiving, by a mobile computing device and from a remote computing device, an identifier of a first media content item; causing, by the mobile computing device, display of the first media content item to a first viewer; sensing, by an image detector of the mobile computing device, image data of the first viewer during display of the first media content item to the first viewer; determining, by a location sensor of the mobile computing device, a location of the mobile computing device during display of the first media content item to the first viewer; sending, by the mobile computing device and to an image device, the image data of the first viewer; sending, by the mobile computing device and to the remote computing device, an impression-reporting message including: the identifier of the first media content item and the location of the mobile computing device during display of the first media content item to the first viewer; and, receiving, by the mobile computing device and from the remote computing device, an impression score based at least in part on: the identifier of the first media content item, the location of the mobile computing device during display of the first media content item to the first viewer, and the viewing impression data based on the image data of the first viewer.

A system for distributing media content and tracking viewer impressions in an out-of-home context includes: a mobile computing device configured to: receive, from a remote computing device, an identifier of a first media content item; cause display of the first media content item to a first viewer; sense, by an image detector of the mobile computing device, image data of the first viewer during display of the first media content item to the first viewer; determine, by a location sensor of the mobile computing device, a location of the mobile computing device during display of the first media content item to the first viewer; send, to an image device, the image data of the first viewer; send, to the remote computing device, an impression-reporting message including: an identifier of the first media content item and the location of the mobile computing device during display of the first media content item to the first viewer; and, receive, from the remote computing device, an impression score based at least in part on: the identifier of the first media content item, the location of the mobile computing device during display of the first media content item to the first viewer, and the viewing impression data based on the image data of the first viewer; and the remote computing device configured to: send, to the mobile computing device, the identifier of the first media content item; receive, from the mobile computing device, the impression-reporting message; and send, to the mobile computing device, the impression score.

A method for distributing media content and tracking viewer impressions in an out-of-home context includes: sending, by a remote computing device and to a mobile computing device, an identifier of a first media content item; receiving, by the remote computing device and from an image device, viewing impression data based on image data of a first viewer; receiving, by the remote computing device and from the mobile computing device, an impression-reporting message including: the identifier of the first media content item and a location of the mobile computing device during display of the first media content item to the first viewer; determining, by the remote computing device, an impression score based at least in part on: the identifier of the first media content item, the location of the mobile computing device during display of the first media content item to the first viewer, and the viewing impression data based on the image data of the first viewer; and sending, by the remote computing device and to the mobile computing device, the impression score.

A system for distributing media content and tracking viewer impressions in an out-of-home context includes: a remote computing device configured to: send, to a mobile computing device, an identifier of a first media content item; receive, from an image device, viewing impression data based on image data of a first viewer; receive, from the mobile computing device, an impression-reporting message including: the identifier of the first media content item and a location of the mobile computing device during display of the first media content item to the first viewer; determine, an impression score based at least in part on: the identifier of the first media content item, the location of the mobile computing device during display of the first media content item to the first viewer, and the viewing impression data based on the image data of the first viewer; and send, to the mobile computing device, the impression score.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 2A-2D are various block diagram depicting a mobile device and a processing server of the system of FIG. 1 for distributing media content and tracking viewer impressions in accordance with illustrative embodiments.

Figure 1:
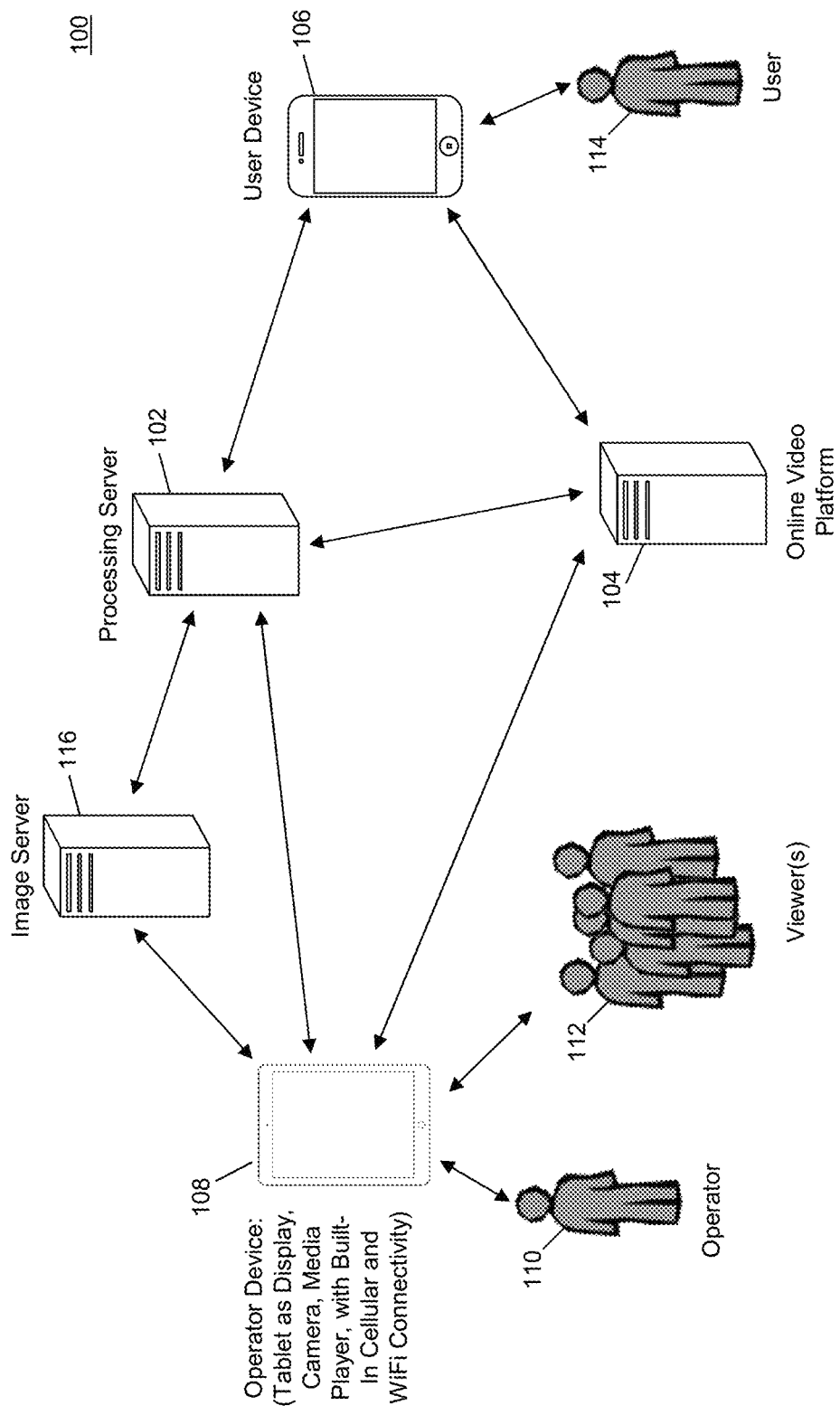
FIG. 1 is a block diagram depicting an high-level system architecture for distributing media content and tracking viewer impressions in accordance with illustrative embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Aspects of the technical solution provide users the ability to select media content items (e.g., audio and/or visual media) for distribution to viewers within a particular geographic area by leveraging personal mobile devices (e.g., tablets, phones, etc.) of people within the particular geographic areas. Aspects of the technical solution also provided the ability to capture audience engagement, track impression credit, and prevent fraud in the distribution of the media content items.

In one illustrative use case, a user may download a content-location-selection (CLS) software application to the user's device to select particular geographic locations or areas where operator devices must show their submitted media content items. For instance, the user may download a mobile app (e.g., the Walltime™ app) to the user's smartphone from a mobile app store. The CLS software application, when executed by the user's device, may permit the user to select media content items (e.g., user-created content, advertiser-created content, or other media content) and geographic areas in which the selected content items should be distributed via personal mobile devices (e.g., tablet computers) of people within the selected geographic areas. The user's selections (e.g., selected media content items and geographic areas) may be sent to a processing server associated with the software application (also referred to herein as a "processing server") for storage and retrieval by people within (or planning to be within) the particular geographic areas.

Other people (also referred to herein as operators) may download a content distribution (CD) software application to mobile devices (e.g., tablet computers) that may be personal devices or supplied to them. For instance, the people may download a CD mobile application to their tablet computers from a mobile app store or the processing server. The operator may be able to use the CD mobile application program to display advertisements, product brochures, etc. to individuals (also referred to herein as viewers) to capture impressions therefrom on behalf of users (e.g., advertisers, product manufacturers, research firms, political campaigns and other entities). In some cases, the operator may use the CD software program to physically show the display of the tablet to a viewer and gather impressions accordingly by recording (e.g., using a front-facing camera) the impression of the viewer. Impressions may be as simple as counting faces (e.g., by standard techniques) which offer the most privacy, but may be as complex as tracking facial expressions time-stamped in synchronization with the content if it is dynamic (e.g., slide show or video). It could also record audio of the viewer during the display.

As an example, the operator may be standing at a street corner within one of the particular geographic areas and display, to a passerby, the media content item corresponding to that particular geographic area. In such an example, a product manufacturer may have advertisements or other information regarding a new product presented to individuals to gather focused feedback in the form of first impressions when the individual views the product information or advertisement. The operator may be compensated by the advertisers or other entities based on the captured impressions.

System for Distribution of Media Content and Tracking of Impression Data

FIG. 1 illustrates a system 100 for distributing media content and tracking viewer impressions in an out-of-home context. The system 100 may include one or more of a processing server 102, an online video platform 104, a user device 106 for a user 114, an operator device 108 of an operator 110 to output media to one or more viewers 112, and an image server 116, each of which will be explained in additional detail below.

As discussed herein, "content item" or a "media content item" may refer to any type of visual media and/or audio media that is capable of being output visually and/or audibly by an electronic device. The visual media may include static media such as an electronic image, poster, flyer, picture, logo, card (e.g., business card, greetings card, etc.), and the like. The visual media may include dynamic media such as a video, animation, dynamic graphic or otherwise visually changing object over time. Additionally or alternative to visual media, the media content may include audio such as an audio component of a video, narration, description of a product, a dialogue, a jingle, contact information of the user 114, etc. and/or some combination thereof.

Examples of media content items include commercials, advertisements, movies, songs, television shows, or other videos, pictures, audio and the like.

As discussed herein, "out-of-home context" may refer to when viewers consume media content in a place other than their home, but the invention is not limited to this context because the mobile devices can be carried into homes, businesses, on a street, etc. As an example, a viewer who views an electronic billboard is consuming media content in an out-of-home context. As another example, a viewer who views media content on a mobile device such as a tablet while walking along a street is consuming media content in an out-of-home context, even if the mobile device belongs to another person. As yet another example, a viewer who views content in another person's home is consuming content in an out-of-home context. While many use cases of aspects described herein focus on an out-of-home context, the features described herein may also apply when users consumes media content in their own homes when an operator visits.

The user device 106 may be responsible for selection of content items, policies associated with distribution of the content item (e.g., selecting geographic areas and timeframes for content distribution), and impression score rules. The user device 106 may include one or more components of a computer system 600 discussed below in FIG. 6. As an example, the user device 106 may be a smartphone of the user 114 that includes a processor and memory configured to execute computer-executable code. The user device 106 may communicate with the processing server 102 and/or online video platform 104 via one or more wired and/or wireless networks (e.g., an internet protocol network, a cellular network, a fiber network, a coaxial network, etc. and/or any combination thereof). While examples discussed herein describe the user device 106 as a smartphone of user 114, in other examples the user device 106 may be a tablet computer, laptop computer, personal computer, wearable computing device (e.g., smartwatch), netbook, server, or any other computing device. The user device 106 may download a CLS software application (e.g., the Walltime™ mobile app) from a mobile app store or a web server associated with the processing server 102. The CLS software application may cause the user device 106 to perform certain actions or functions when executed. For instance, when the CLS software application is opened, the user device 106 may open a user interface and have access to functions specific to the CLS software application.

The user device 106, via the CLS software application, may provide the user 114 with various menus to upload a media content item to an online video platform 104. The video online platform 104 may be responsible for storing and distributing media content to other devices over a network such as the Internet. The online video platform 104 may include one or more servers (e.g., web servers) that permit users to upload media content (e.g., video, audio) for storage and retrieval by other devices through a web interface. Examples of online video platforms include YouTube™, Vimeo™, and the like, which can be selected and connected to via the user interface of the user device 106. The video online platform 104 may include one or more components of a computer system 600 discussed below in FIG. 6. The online video platform 104 may communicate with the processing server 102, user device 106, and/or operator device 108 via one or more wired and/or wireless networks (e.g., an internet protocol network, a cellular network, a fiber network, a coaxial network, etc. and/or any combination thereof).

The user 114 may be presented a user interface in the CLS software application to create a visual and/or audio recording using the camera and/or microphone of the operator device 108, which may then be uploaded to the online video platform 104. In some cases, the CLS software application may utilize other applications installed on the user device 106 such as a camera app to facilitate a recording for upload onto the online video platform 104 and display on the operator device 108. The various videos and when they are scheduled to displayed on the operator device 108 in shown. Note too that the user 114 may be permitted view the viewers 112 through the CLS software application using the camera function shown, in certain embodiments, which is in addition to the impression data. The media file may be stored in a file (e.g., photos app of the user device 106, remote database, etc.) and uploaded to the online video platform 104. While in some examples, the media content item may be created by user 114, in other examples, the media content item may be created by an entity different from user 114 and posted on the online video platform 104.

The user device 106, via the CLS software application, may provide the user 114 with various menus to select a media content item for distribution via operators 110. For instance, the user 114 may be presented a user interface to a media content item from a list of uploaded media content items obtained from the online video platform 104. In this image, the proposed compensation for an operator 110 is shown adjacent the videos, such that the operator 110 can select those he or she wishes to display. Geographic areas could also be displayed. For instance, after the media content item has been uploaded to the online video platform 104 and based on a user selection of the media content item, the operator device 108 may obtain, from the online video platform 104, a uniform resource locator (URL) for the web page to access (e.g., download, stream) the media content item stored on its web server. In some cases, the list of media content items may include media content items accessible by local or remote memory of the user device 106.

The user device 106, via the CLS software application, may provide the user 114 with various menus to select a geographic area within which to distribute the selected media content item. As an example, the user device 106 may, using a database of maps and addresses, search for a particular address input by the user 114, which may be displayed to the user 114 on a geographical map via a visual marker (e.g., a pin drop, and/or drawn geographic area). In some cases, a description of the location may also be displayed as an overlay on (or adjacent to) the geographical map. The user 114 may perform new searches until the user 114 obtains the desired geographic location. The geographic area may be based on one or more of governmental boundaries (e.g., country, state, county, zip code, etc.) or a user-selectable maximum distance (e.g., miles, kilometers, feet, city blocks, etc.) from an address or other selected geographic location. The geographic area may be visually indicated in the form of a shaded geographical area overlaid on the geographical map or an outline of a boundary of the geographical area. In some cases, the user device 106 may obtain geographical maps from a map provider. In some cases, once the user 114 has achieved the desired geographical area in which the selected content item should be distributed, the user 114 may confirm selection of the geographic area.

The user device 106, via the CLS software application, may provide the user 114 with various menus to select a time frame within which to distribute the selected media content item in the selected geographic area. The user 116 may enter which dates and times of day the user 116 wishes for the operators 110 to distribute the selected media content item in the selected geographic area either through key pad or calendar interface.

The user device 106, via one or more user interfaces provided by the CLS software application, may be responsible for user selection of one or more impression score rules to the processing server 102. The user 114 may provide a good or service that is associated with the media content item and wish to utilize the processing server 102 to distribute its media content via operator 110. As a result, the user device 106 may set one or more impression score rules, which the processing server 102 may store and use to generate an impression score for the operator 110 based on impressions of viewer 112 to its media content. Impression score rules will be discussed in additional detail below.

The user device 106 may generate a brief description of the item and user 114. In some cases, the brief description may be based on user input from user 114.

Once the selections of the media content item, policies associated with distribution of the media content item (e.g., the geographic area, time frame, etc.) and impression score rules have been selected, the user device 106 may associate each of these selections with one another. Additionally, the user device 106 may send the selections and associations to the processing server 102. As an example, the user device 106 may send the selection of the media content item to the processing server 102. For instance, the user device 106 may send a URL to the media content item provided by the online video platform 104. In some cases, the media content item itself may be sent to the processing server 102. As another example, the user device 106 may send the selection of the geographic area within which the selected media content item is to be distributed by operator 110. For instance, the user device 106 may send the governmental boundary (e.g., zip code), a geographic location and a maximum distribution distance from the geographic location or a geofence by drawing a line on a map, perhaps with a snap function that places the line or roads or other geographic markers. In some cases, each of the selections and associations for a particular content item may be transmitted to the processing server 102 in a single message, such as over the internet. The message may also include a user identifier for user 114, a user device identifier for user device 106, and the generated brief descriptions of the media content item and user 114, each of which may also be associated with the user's 114 selections.

The processing server 102 may be responsible for coordinating distribution of media content in an out-of-home context, tracking impressions, and providing impression scores, among other responsibilities using the methods described herein. The processing server 102 may be any type of computing device that has been specifically configured to perform the functions as described herein. For instance, the processing server 102 may include one or more components of a computer system 600 discussed below in FIG. 6. As an example, the processing server 102 may be one or more servers that include a processor and memory configured to execute computer-executable code. The servers may communicate with the online video platform 104, the user device 106, operator device 108, and imaging server 116 via one or more wired and/or wireless networks (e.g., an internet protocol network, a cellular network, a fiber network, a coaxial network, etc. and/or any combination thereof).

The processing server 102 may be responsible for permitting and managing registration by the user 114, user device 106, operation device 108, and/or operator 110. The processing server 102 may collect registration information by providing a registration application. As an example, registration applications may be transmitted in a message via a network. In response, the processing server 102 may receive registration information. As another example, the processing server 102 may be a web server that provides a registration application website in which registration information may be entered. Registration information may be stored in a registration database of the processing server 102. The registration database may be a relational database such as a structured-query-language (SQL) database that associates registration information with one another via relational tables, for example. For the user 114 and the operator 110, registration information may include a username and password. For the user device 106 and operation device 110, registration information may include a device ID (e.g., a media access control (MAC) address).

The processing server 102 may also manage selections and associations provided by the user device 106, which may be stored in a relational (e.g., SQL) database. As discussed above, the processing server 102 may receive, from the user device 106, a user ID, user device ID, a reference (e.g., URL) to the online video platform 104 at which a selected media content item is stored (or a copy of the selected media content item itself), a selected geographic area, a selected time frame, one or more selected impression score rules, and their respective associations with one another. This information may be stored in a relational database according to their associations. If association information is not found, the processing server 102 may determine the associations by associating items included in the same message to one another. As an example, one or more impression score rules received in a message may be specific to a particular media content item and, thus, may be linked to the corresponding media content item identifier in the relational database. In some cases, the processing server 102 may generate a unique identifier, associate the unique identifier with the information included in a message received from the user device 106, and include the unique identifier in the relational database.

The operator device 108 may be responsible for distributing media content items to viewers 112 and aid the processing server 102 with tracking of impression scores using methods discussed herein. The operator device 108 may be any type of mobile computing device that has been specifically configured to perform the functions as described herein. The operator device 108 may include one or more components of a computer system 600 discussed below in FIG. 6. For instance, the operator device 108 may include a processor and memory configured to execute computer-executable code. The operator device 108 may communicate with the processing server 102, the image server 116, and/or the online video platform 104 via one or more wired and/or wireless networks (e.g., an internet protocol network, a cellular network, a fiber network, a coaxial network, etc. and/or any combination thereof).

The operator 110 may be an owner or possessor of the operator device 108 who wishes to distribute content items to viewers 112 on behalf of users 114. While examples discussed herein describe the operator device 108 as a tablet computer of operator 110, in other examples the operator device 108 may be a smartphone, wearable device (e.g., smart watch), laptop computer, netbook, personal computer, or any other mobile computing device. The operator device 108 may download a content-distribution (CD) software application from a mobile app store or a web server associated with the processing device 102. The CD application may cause the operator device 108 to perform certain actions or functions described herein when executed. For instance, the CD application may cause the operator device to perform one or more of the method steps discussed herein.

The CD application may be responsible for managing an operator's 110 distribution of content items to viewers 112. As a result, the operator device 108 may receive, from the processing server 102, data for use by the CD application. Such data may include a user ID, user device ID, a media content item ID, a reference (e.g., URL) to the online video platform 104 at which a selected media content item is stored (or a copy of the selected media content item itself), a selected geographic area, a selected time frame, one or more selected impression score rules, and their respective associations with one another. In some cases, the user device 108 may receive instructions from the processing server 12 to perform one or more functions described herein.

The operator 110 may wish to obtain an impression score by presenting (e.g., display and/or audibly emit) the selected media content item to viewers 112 within the selected geographic area and time frame. In one illustrative use case, the operator device 108 may be a tablet computer that is presented to a passerby (e.g., as the viewer 112) by a person (e.g., as the operator 110) to display a video advertisement (e.g., the selected media content item) to the passerby.

In particular, the operator device 108, via the CD software application, may permit the operator 110 to select a geographic area and a time frame the operator 110 plans to be within the geographic area. In some cases, operator's 110 selected geographic area may be based on the current location of the operator device 108. In such cases, the operator device 108 may determine its location via its GPS sensor and/or other geographic location technologies (e.g., cellular or Wi-Fi triangulation). The operator device 108 may receive input from the operator 110 specifying a maximum distance the operator 110 is willing to travel from the current location of the operator device 108. The operator device 108 may determine the geographic area based on the current location and the maximum distance. The operator 110 may also specify the time frame (e.g., day, time, etc.) via a user interface of the CD software application. In some cases, the time frame may be a current time when the operator accesses the CD software application.

The operator device 108 may display a list of content items selected by users 114, corresponding geographic areas for distribution of the content items set by users 114, corresponding time frames set by users 114, and corresponding impression score rules. In some cases, the list may include a brief description for each content item and corresponding user 114 via the above-mentioned pull up means. The list of content items may be generated based on the selections by the operator 110 (e.g., geographic area and time frame set by the operator 110). For instance, the operator device 108 may compare geographic area and time frame set by the operator 110 with geographic areas and time frames set by users 114, respectively. If there is overlap between the geographic area set by the operator 110 and the geographic area set by the user 114 as well as overlap between the time frame set by the operator 110 and the time frame set by the user 114, the user's 114 content item corresponding to the geographic area and time frame set by the user 114 may be included in the list. Otherwise, if there is no overlap, the content item might not be included in the list.

The operator device 108 may select to distribute one of the content items on the list and the operator 110 may move the operator device 108 into the geographic area corresponding to the selected content item for display to a passerby using the operator device 108. In response, the operator device 108 may obtain, using the URL of the content item, the content item from the online video platform 104. In some cases, the content item may be obtained in its entirety prior to displaying the content item to a viewer 112. In other cases, the content item may be streamed (e.g., downloaded) while the user device 108 also displays the content item to the viewer 112.

The operator device 108, executing the CD software application, may be configured to capture image data of the viewer 112 and the location of the operator's device as the viewer views the content item using a front-facing camera and location sensor (e.g., GPS sensor) of the operator's device, respectively. The CD software application may also be configured to generate a unique identifier for the viewing by the passerby and a timestamp of when the passerby completes viewing of the media content item. The operator device 108 may send the unique identifier, timestamp, and location data to the processing server in an impression-reporting message, which will be explained in further detail below.

As used herein, a front-facing camera of a device may be a camera positioned to image a user as the user faces a display screen of the device (e.g., the camera and display of the device may be located on the same side of the device such as a front face of the device).

The unique identifier and image data may be sent to image server 116 configured to analyze the image data (also referred to herein as an "image server"). In order to maintain the privacy of the passerby from the operator, the CD software application may block access to the image data by the operator and, once the image data has been sent to the image server 116, cause the operator's device to remove and/or otherwise delete the image data from its memory.

The image server 116 may be responsible for analyzing the image data and generating facial impression data. The image server 116 may include one or more components of a computer system 600 discussed below in FIG. 6. For instance, the image server 116 may include a processor and memory configured to execute computer-executable code. The image server 116 may communicate with the operator device 108 and processing server 102 via one or more wired and/or wireless networks (e.g., an internet protocol network, a cellular network, a fiber network, a coaxial network, etc. and/or any combination thereof).

Once the image server 116 receives the image data from the operator device 108, the image server 116 may analyze image data to determine facial measurements (also referred to herein as "facial impression data") using facial analytics algorithms. Once analyzed, the image server 116 may remove and/or otherwise delete the image data from its memory and send the resulting facial impression data and the unique identifier to the processing server 102. In some cases, the facial impression data and the unique identifier may be sent to the operator device 108 to associate with the location data and timestamp and for inclusion in the impression-reporting message.

As used herein, facial impression data of viewer 112 may be based on facial imaging data of the viewer 112, which is captured by operator device 108. The facial impression data may correspond to a facial fingerprint of the viewer 112, which may be generated by analyzing the facial imaging data of the viewer 112. For instance, various distances between various points on the face of the viewer 112 may be measured. Two distances having a common point may be triangulated. In some cases, the imaging data includes data taken over a short period of time (e.g., 2 seconds). In such cases, temporal measurements may also be taken. As an example, the eyes of the viewer 112 may be analyzed to determine whether they have moved, which helps determine that the facial imaging data correspond to a live person rather than a photo, manikin, or the like. Facial impression data may include a count of the number of eyes detected in the image data.

As discussed above, the operator device 108 may send an impression-reporting message to the processing server 102. The impression-reporting message may include the unique identifier for the impression, timestamp, and location data captured during viewing of the content item by the viewer 112. The impression-reporting message may also include an operator identifier, an operator device identifier, a media content item identifier, and a user identifier. In some arrangements, the image server 116 may send the facial impression data to the operator device 108 for inclusion within the impression-reporting message. In other arrangements, the image server 116 may send the facial impression data and the unique identifier to the processing server 102. The processing server 102 may then associate the facial impression data with the location data and time stamp by matching the unique identifier in the impression-reporting message with the same unique identifier received from the image server 116. Once received and associated, the information may be stored in the relational database of the processing server 102. In some instances, the impression-reporting messages may be sent on a per impression basis. In other instances, a number of impressions may be collected and the impression-reporting message may include a batch set of data for the impressions.

The processing server 102 may be responsible for tracking viewer impressions, executing fraud prevention policies, and determining impression credit for the operator 110. In general, the impression score rules may be designed to prevent fraud by the operator 110 as well as determine credit the operator 110 should receive for obtaining an impression of the viewer 112. Specifically, the processing server 102 may, based on the impression score rules corresponding to the media content item identifier, determine whether fraud occurred and, if not, an impression score for the operator 110. The processing server 108 may transmit the impression score to the operator device 108 for display to the operator 110.

One or more impression score rules may be based on facial impression data. As an example, an impression score rule may specify that each set of facial impression data obtained by the operator device 108 for a particular media content item must be associated with a different person in order for the operator 110 to obtain an impression score for the facial impression data. As a result, multiple sets of facial impression data of the same viewer may only be used once to generate an impression score thereby preventing the operator 110 from obtaining multiple impression scores by repeatedly showing the media content item to the same viewer 112.

The processing server 102 may determine whether new facial impression data received from the operator device 108 is the "same" as previously recorded facial impression data thereby determining whether the facial impression data is for the same viewer 112. As discussed above, the processing server 102 may store facial impression data in a relational database (now shown). The relational database may be populated by information included in impression-reporting messages sent by the operator device 108. As a result, each set of facial impression data may be linked in a relational table to one or more of the operator 110, viewer 112, operator device 108, and media content item identifier that was shown to the viewer 112.

The processing server 102 may determine whether newly received facial impression data is the same as previously recorded facial impression data by calculating a similarity score. The similarity score may be based on a comparison of various corresponding distances between various points of the face of the viewer 112. As an example, the distance between the viewer's 112 ears may be compared. As another example, the distance between the viewer's 112 eyes may be compared. As yet another examples, the distance between the viewer's 112 noise and chin may be compared. The facial impression data may be considered the same if they are substantially similar (e.g., the similarity score is greater than or equal to a minimum similarity score threshold). Similarly, the facial impression data may be considered to be different if they are not substantially similar (e.g., the similarity score is less than the minimum similarity score threshold).

One or more impression score rules may be based on location data. As an example, an impression score rule may specify that the viewer 112 consume (e.g., be shown) the media content item within a particular geographic area in order for the operator 110 to receive an impression score for the viewer 112. As the viewer 112 consumes the media content, the operator device 108 may use its GPS sensor to determine the location of the user device, which, in turn, may be sent to the processing server 102 along with the identifier of the consumed media content item.

The particular geographic area may be set and/or otherwise determined in a variety of ways. In some instances, the particular geographic area may be set by governmental boundaries (e.g., country, state, county, zip code, etc.). In such instances, the processing server 102 may determine whether the GPS location of the operator device 108 when the viewer 112 consumed the media content is within the particular geographic location. The determination may be performed using a look up table stored by the processing server 102 that correlates GPS coordinates with geographic areas (e.g., country, state, county, zip code, etc.). After looking up the geographic area in which operator device 108 was located based on its GPS coordinates, the processing server 102 may determine whether the geographic area in which the operator device 108 was located matches the particular geographic area set by the impression score rule. If so, the processing server 102 may determine that the viewer 112 consumed the media content item within the particular geographical area and permit generation of an impression score for the operator 110 for this particular impression (unless another fraud prevention policy is violated). Otherwise, if the geographic area in which the operator device 108 was located does not match the particular geographic area, the processing server 102 may determine that the viewer 112 did not consume the media content item within the particular geographic area and inhibit generation of an impression score for this particular impression.

In some instances, the particular geographic area may be defined by a maximum distance from a location set by the user 114. The distance may be specified in any unit for distance including, for example, miles, kilometers, feet, city blocks, or the like. As an example use case, the user 114 may be an owner of a pizzeria, which may set the preset distance to be 1 mile from the pizzeria's location. The processing server 102 may identify the location of the operator device 108 when an impression was taken from the impression-reporting message sent by the operator device 108. The processing server 102 may determine a distance between the location of the user 114 and the location of the operator device 108 when the user consumed the media content item. If the distance is less than or equal to a maximum distance threshold (e.g., 1 mile), the processing server 102 may permit generation of an impression score for this impression (unless another fraud prevention policy is violated). Otherwise, if the distance is greater than the maximum distance threshold, the processing server 102 may prevent generation of an impression score for this impression.

One or more impression score rules may be based on temporal data. As an example, an impression score rule may specify that the viewer 112 consume the media content item within a particular time period (e.g., temporal range) in order for the operator 110 to receive an impression score for the viewer 112. The temporal window may be set in any metric of time including, for example, minutes, hours, days, months, years, etc. In some cases, the time period may be specified by calendar dates. The operator device 108 may generate a timestamp of when the viewer 112 consumes the media content item. The timestamp may include day, month, year, hour, minute, and seconds, which may be included an impression-reporting message for the impression. The processing server 102 may determine whether the viewer 112 consumed the media content item within the particular temporal window by determining whether the timestamp is within the particular temporal window. If so, the processing server 102 may permit generation of an impression score for the impression (unless another fraud prevention policy is violated). Otherwise, if the timestamp is not within the temporal window, the processing server 102 may prevent generation of the impression score for this impression.

Impression scores may be determined based on impression score rules corresponding to the media content item that was viewed by the viewer 112. An impression score rule may specify an amount for the score. In some cases, the impression score may be fixed amount for an impression satisfying other rules based on one or more facial impression data, location data, and temporal data. In some cases, the impression score may be determined using a formula that accounts for a variety of factors. A factor may be based on the number of impressions obtained in a particular temporal window. For instance, the impression score may increase when the user obtains a goal number of impressions during the particular temporal window. A factor may be based on the operator's 110 ability to obtain feedback from the viewer 112. A factor may be based on the geographic area in which the operator 110 obtained the viewer's 112 impression. As an example, the operator 110 may receive a higher impression score for obtaining the viewer's impression in a particular geographic area and a lower impression score for obtaining viewer impressions in geographic areas outside of the particular geographic area. While the facial impression data is specific to the viewer, the impression score is specific to the operator 110 and provides the operator 110 with an incentive to collect more viewer impressions on behalf of the user 114.

The processing server 102 may be responsible for tracking impression scores and providing score reports to the user 114. The impression scores may be linked to the operator 110 and/or operator device 108 in the relational database and include timestamps of when the impression of the viewer 112 was taken (which may be received in impression-reporting messages). The processing server 102 may generate and transmit impression reports for a particular time period and transmit such reports to the user 114.

In one or more arrangements, a current location and profile of the operator 110 may be communicated to the user device 108 for selection and/or approval by the user 114. Specifically, the operator device 108 may be configured to share its current location with the processing server 102, which, in turn, may forward the location along with the operator's profile to the user device 108 for display to user 114. The profile may include various analytics of the operator 110 (e.g., impression-acquisition rate, impression-acquisition total, population density of area surrounding operator 110, and the like). The profile may also include impression score rules set by the operator 110.

In one or more arrangements, the operator device 108 may, rather than output the media content via its built-in display device, output the media content to a remote display device (e.g., projector, television, monitor, electronic billboard, etc.) for output. In such cases, the operator device 108 may transmit the media content item and instructions to output the media content item to the display device, which, in turn, causes the display device to output (e.g., display and/or audibly emit) the media content item to the viewer 112. In some instances, the instructions may also include instructions to capture facial imaging data using a camera of the display device and transmit the facial imaging data to the operator device 108. In some instances, the operator device 108 may prompt the operator 110 to use the camera of the operator device 108 to capture the facial imaging data of the viewer 112. The display device may include one or more components of system 600. In cases where the user 114 (e.g., an advertiser or other entity) is selecting geographic locations or areas for display of media content items and collection of impressions, the user 114 may be able to select established display devices. For example, display devices may be large-format displays, such as wall projections, in set geographic locations, where the advertiser or other entity may request media content items to be displayed on such devices, where operators 110 may capture impressions on operator devices 108 at the geographic location when the media content is displayed.

In one or more arrangements, the operator device 108 itself can generate facial impression data, the operator device 108 may block sending of the image data of the viewer 112 to other devices and may remove (e.g., delete) the imaging data once the operator device 108 generates the facial impression data. The facial impression data may then be included in an impression-reporting message.

While in some examples, a feature may be described in the singular form (e.g., a media content item, a geographic area, a time frame, a user 112, an operator 110, viewer 112, a processing server 102), in other examples the feature may be in the plural form (e.g., multiple media content items, geographic areas, time frames, etc.).

Processing Components of Mobile Device and Processing Server

FIGS. 2A-2D are various block diagram depicting a operator device 108, an image server 116 and a processing server 102 of the system 100 of FIG. 1 for distributing media content and tracking viewer impressions in an out-of-home context in accordance with illustrative embodiments. The operator device 108 may also be referred to herein as a "mobile computing device" or "mobile device."

As shown in FIG. 2A, the operator device 108 of a user may include a camera and GPS sensor 202, the image server 116 may include a facial analytics component 204, and the processing server 102 may include a comparator 206, a counter 208, and a score generator 208. The camera and GPS capture image data and location data, respectively, as a viewer 112 views a media content item.

The operator device 108 sends the image data to the image server 116, which routes the data to the facial analytics component 204. The facial analytics component 204 may, based on the imaging data, generate facial impression data and send the facial impression data to the comparator 206 of the processing server 102. The comparator 206 may compare the facial impression data with previously recorded facial impression data that is associated with the media content item and taken by the operator, which is stored in the relational database. If the comparator 206 determines that the facial impression matches facial impression data that is associated with the media content item and taken by the operator, then the comparator 206 may prevent generation of an impression score for the facial impression. Otherwise, if the comparator 206 determines that the facial impression does not match any facial impression data that is associated with the media content item and taken by the operator, then the comparator 206 may send an instruction to the counter 208, which increments the operator's 110 total number of impression scores and instructs the score generator 210 to generate an impression score. In some cases, the impression score may be based on each facial impression on an individual basis. In other cases, the impression score may be based on the total number of impression over a time period, which is determined by the counter 208. In response to a command or after a preset time period has elapsed, the counter 208 may reset to zero. The facial impression data may be recorded in the relational database such that it is associated with the media content item and the operator 110, which may be performed by one of the comparator 206, counter 208, or score generator 210.

Figure 2C:
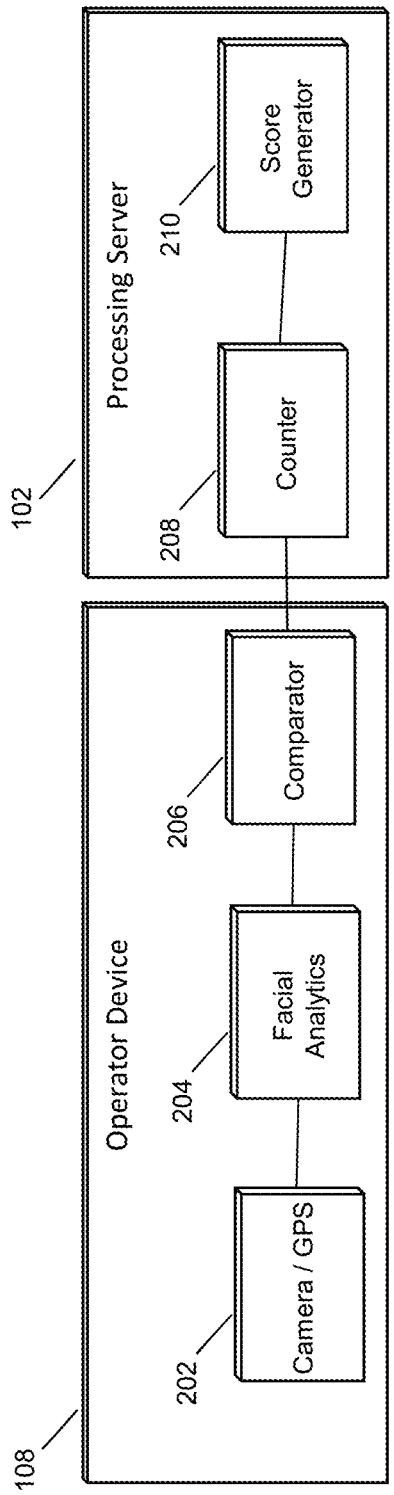
Figure 2D:
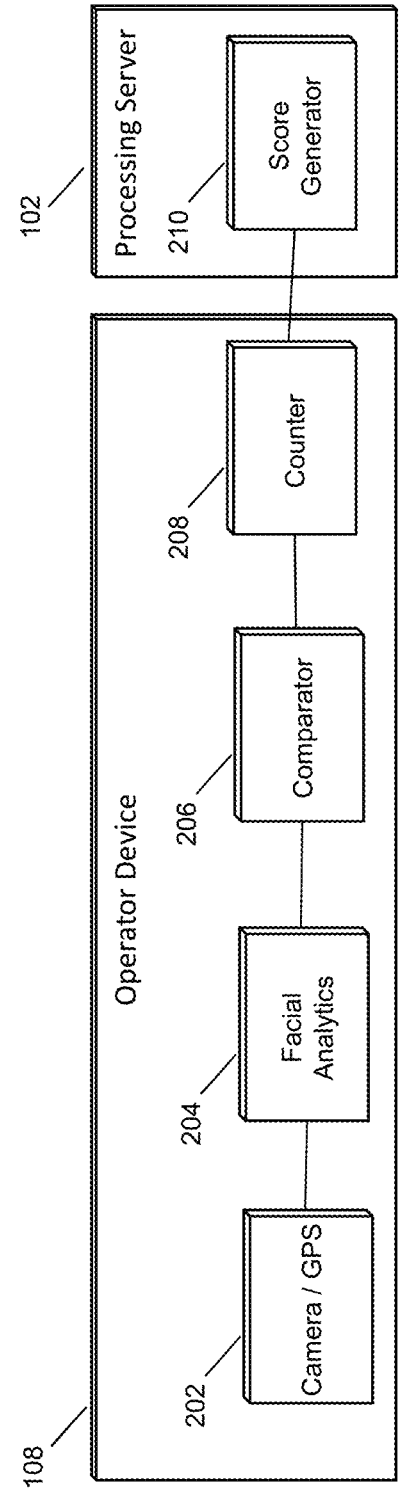

While FIG. 2A depicts one arrangement of processing components, the processing components may be set up in differing arrangements. As an example arrangement, in FIG. 2B, the operator device 108 may include the camera and GPS component as well as the facial analytics component 204. In FIG. 2B, the processing server 102 may include the comparator 206, the counter 208, and the score generator 210. As another example arrangement, in FIG. 2C, the operator device 108 may include the camera and GPS component 202, the facial analytics component, and the comparator 206. In FIG. 2C, the processing server 102 may include the counter 208 and the score generator 210. As yet another example arrangement, in FIG. 2D, the operator device 108 may include the camera and GPS component, the facial analytics component 204, the comparator 206, and the counter 208. In FIG. 2D, the processing server 102 may include the score generator 210.

Each of the arrangements depicted in FIGS. 2A-2D may represent differing levels of security. Specifically, the arrangements are depicted in order from most secure (e.g., FIG. 2A) to least secure (e.g., FIG. 2D). Because the operator device 108 may be the personal device of the operator 110 and, therefore, under the control of the operator 110 rather than the processing server 102, the operator device 108 may be subject to tampering increasing the operator's 110 ability to commit fraud (e.g., create fake facial impression data, force redundant facial impression data to appear non-redundant, inappropriately increment the counter, etc.). As a result, having more processing components under the control of the processing server 102 increases the overall security of the system.

Each of the arrangements depicted in FIGS. 2A-2D may, in some cases, also represent differing levels of capabilities of the operator device 108. Specifically, the arrangements may be depicted in order from least capable (e.g., FIG. 2A) to most capable (e.g., FIG. 2D). As a result, one arrangement (e.g., FIG. 2B) may be used for newer devices having faster processing and programmed with facial tracking features while another arrangement (e.g., FIG. 2A) may be used for older devices that have slower processing and/or not programmed with facial tracking features.

Process for Distributing Media Content and Tracking Impressions

Figure 3A:
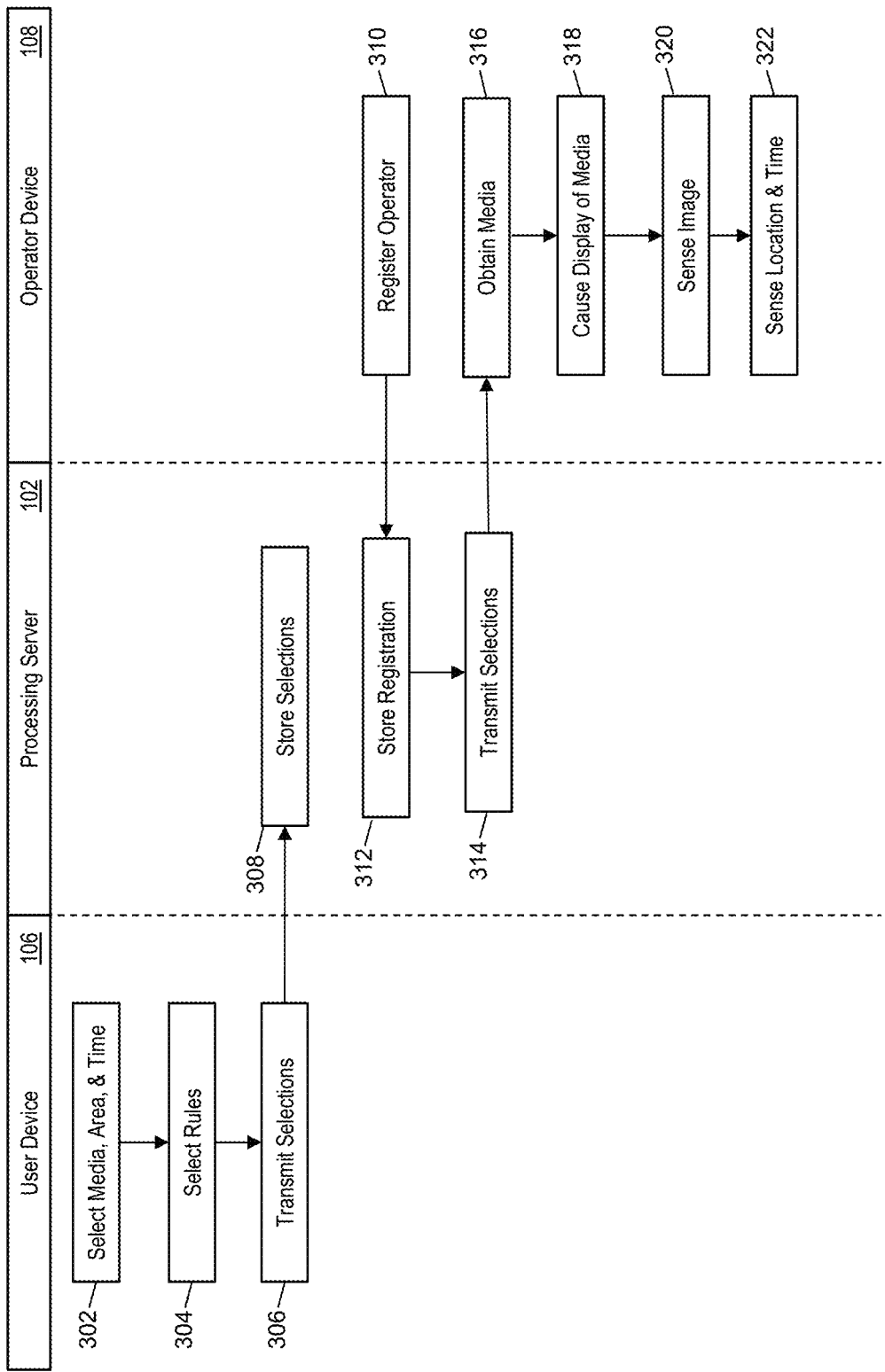
FIGS. 3A-3C is a flow diagram depicting a process for distributing media content and tracking viewer impressions using the system of FIG. 1 in accordance with illustrative embodiments.
Figure 3B:
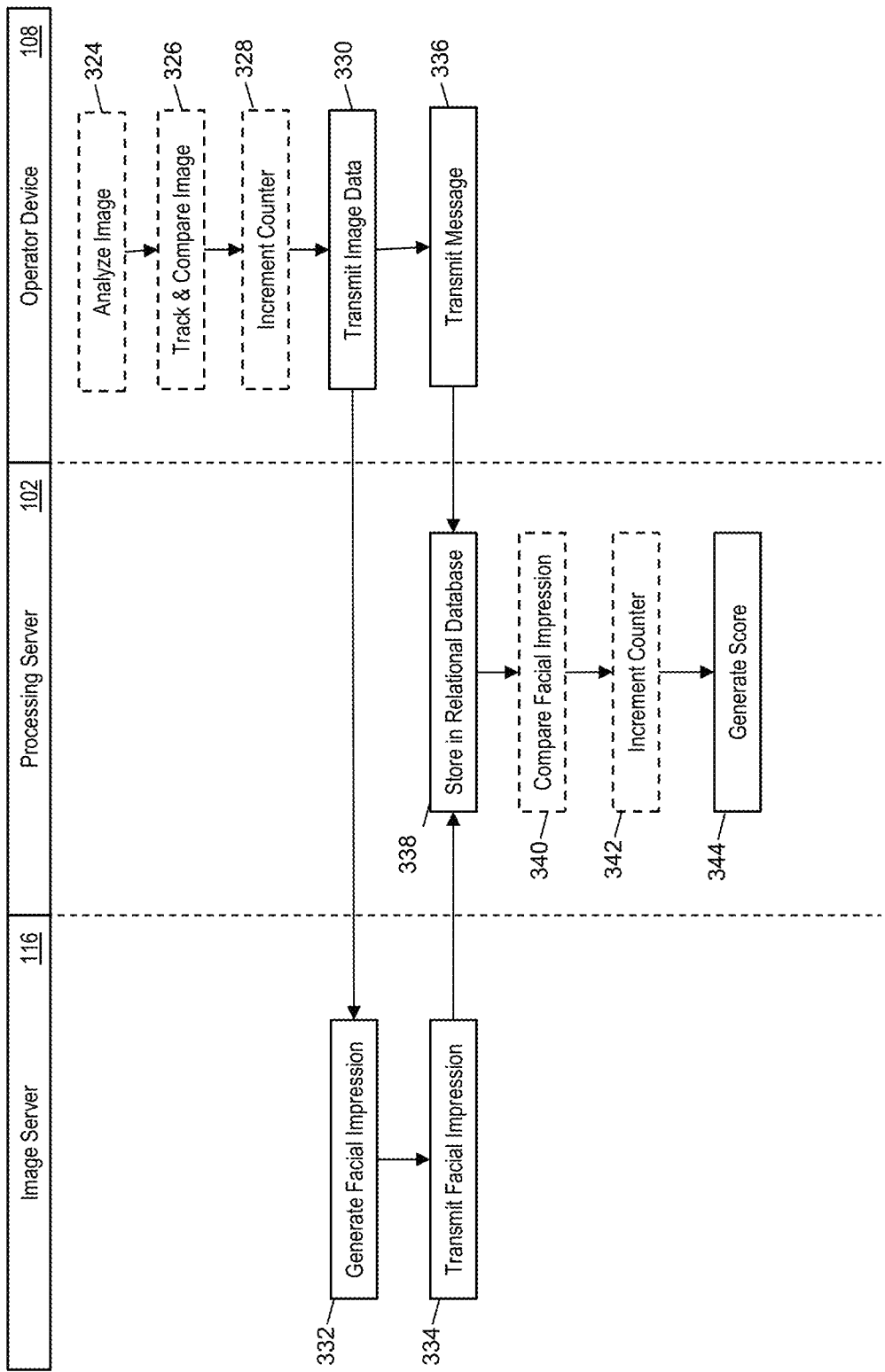
Figure 3C:
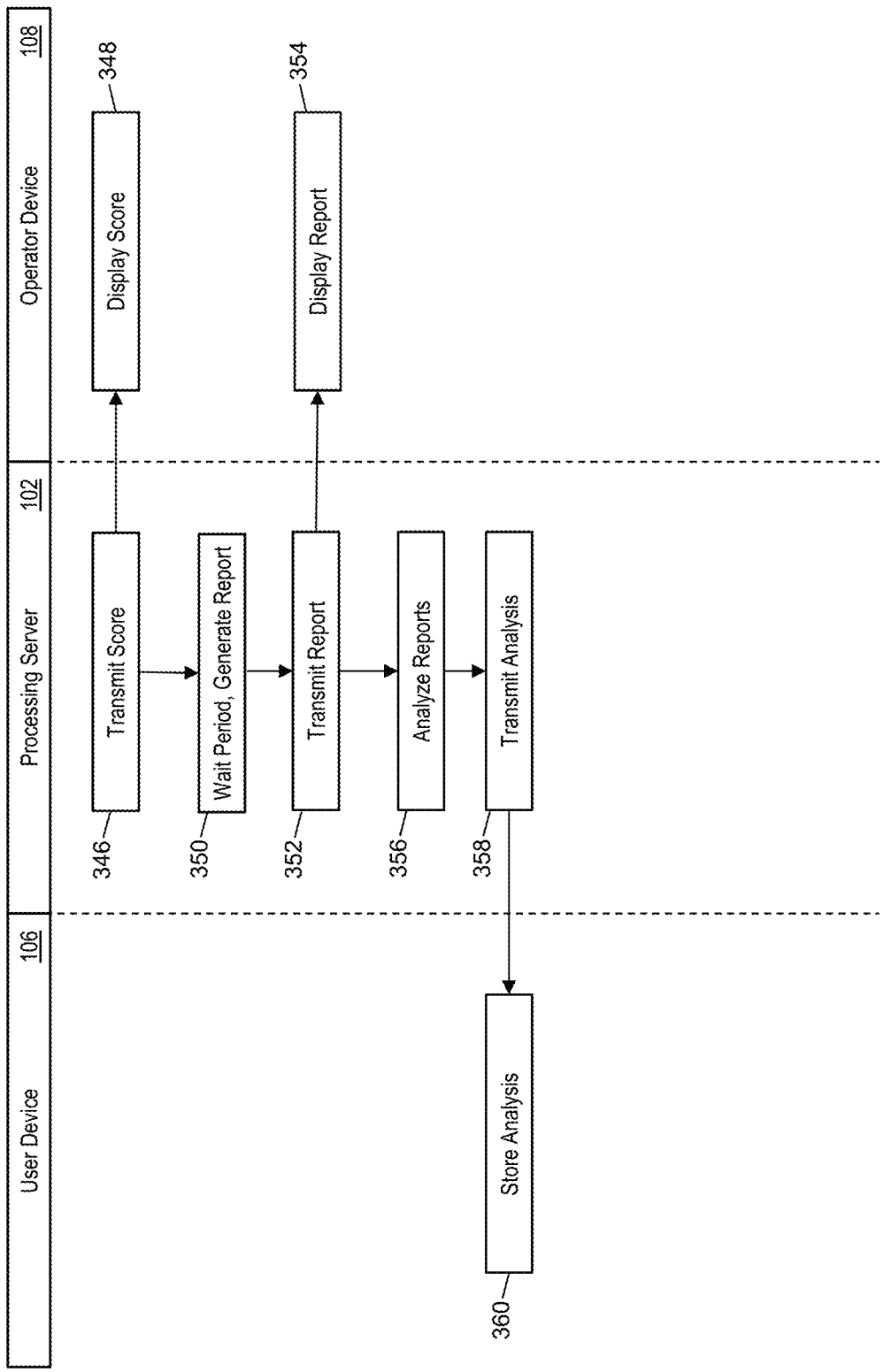

FIGS. 3A-3C is a flow diagram depicting a process for distributing media content and tracking viewer impressions in an out-of-home context using the system of FIG. 1 in accordance with illustrative embodiments. While the steps are illustrated and described in a particular order, the steps may be performed in a variety of other orders.

The process may begin at step 302 in which the user device 106 may select one or more media content items and one or more corresponding geographic areas and time frames in which the media content items are to be distributed. In one example use case, a media content item may be an advertisement for a product or service provided by the user 114. As discussed above, the geographic area may be a governmental or entity-defined boundary or a maximum distance from a selected location.

At step 304, the user device 106 may select one or more impression score rules. As discussed above, the impression score rules may be designed to prevent fraud by the operator 110 as well as determine credit the operator 110 should receive for obtaining an impression of the viewer 112. At step 306, the user device 106 may transmit each of the selections to the processing server 102, which may be stored in a relational database at step 308.

At step 310, the operator device 108 may register with the processing server 102. For instance, the operator device 108 may transmit an operator 110 identifier and an identifier of the operator device 108. At step 312, the processing server 102 may store the registration information of the operator device 108 in the relational database.

At step 314, the processing server 102 may transmit the selections of the media content items, geographic areas, time frames, and impression score rules to the operator device 108. The selections of the media content items may include the URLs of the media content items, which the operator device may use to obtain the media content items from the online video platform 104 at step 316. For instance, the operator device 108 may request and download the media content items from the online video platform 104.

At step 318, the operator device 108 may cause output (e.g., display and/or audibly emit) a media content item associated with the user 114 to a viewer 112. In one example use case, the operator 110 may contact the viewer 112 in an out-of-home context and ask the viewer 122 to consume (e.g., view and/or listen to) the media content item associated with the user 114. If the viewer 112 agrees, the operator 110 may instruct the operator device 108 to cause output of the media content item for consumption by the viewer 112. In some instances, the operator device 108 may, rather than display the media content itself, transmit, to a remote display device (e.g., projector, television, monitor, electronic billboard, etc.), the media content item and an instruction to display the media content item. In such instances, the display device may output the media content item.

At step 320, the operator device 108 may sense and/or otherwise capture imaging data (e.g., facial imaging data) of the viewer 112 as the viewer 112 consumes the media content item. Instructions for capturing the image data while a viewer consumes the media content item may have been sent by the processing server 102 or preprogrammed in a CD software application downloaded by the operator device 108. The imaging data may be captured using one or more front-facing cameras of the operator device 108. In some cases, the imaging data may include multiple images of the viewer 112 taken over a period of time (e.g., 3 seconds).

At step 322, the operator device 108 may sense and/or otherwise determine the location of the operator device 108 as the viewer 112 consumes the media content item. The location data may be determined using a GPS component of the operator device 108. Additionally, the operator device 108 may generate a unique identifier for the impression and a timestamp at the end of playback of the media content item.

At step 324, the operator device 108 may, in some arrangements (e.g., the arrangement depicted FIGS. 2B-2D), analyze the image data to generate facial impression data. As an example, the operator device 108 may measure distances between various points of the viewer's 112 face. As another example, the operator device 108 may compare an eye position across various images to determine if the eye position changes.

At step 326, the operator device 108 may, in some arrangements (e.g., the arrangements depicted in FIGS. 2C-2D), compare the generated facial impression data with the previously recorded facial impression data that is associated with the media content item and taken by the operator 110. In this arrangement, the operator device 108 may store previously recorded facial impression data to compare with the newly generated facial impression data. If the newly generated facial impression data matches any of the previously recorded facial impression data, the operator device 108 may transmit a notification of the match to the processing server 102 and end the process. Otherwise, if the newly generated facial impression data does not match any of the previously recorded facial impression data, the process may continue to step 328.

At step 328, the operator device 108 may, in some arrangements (e.g., the arrangement depicted in FIG. 2D), increment a counter of a total number of impressions, which may be used to determine an aggregate impression score. For instance, each time the operator 110 obtains a facial impression, the operator device 108 may increment the counter by one.

If the operator device 108 is unable to determine facial impression data (e.g., arrangement depicted in FIG. 2A), then the operator device may, at step 330, send the facial image data and the unique identifier for the impression to the image server 116. At step 332, the image server 116 may generate facial impression data for the viewer 112 based on the facial imaging data. At step 334, the image server 116 may transmit the facial impression data and the unique identifier for the impression to the processing server 102 for storage in the relational database at step 338.

At step 336, the operator device 108 may generate an impression-reporting message and transmit the impression-reporting message to the processing server 102 for storage by the processing server 102 at step 332. The impression-reporting message may include one or more of the media content item identifier of the media content item that was consumed by the viewer 112, an identifier of the operator 110, an identifier of the operator device 108, the location data, a timestamp of when the viewer 112 consumed the media content item, and the unique identifier for the impression. Depending on the arrangement, the impression-reporting message may also include facial impression data, an indication of the result of the facial impression data comparison, and/or the current value of the counter. At step 338, the information included in the impression reporting message may be stored in the relational database.

At step 340, the processing server 102 may compare the facial impression data with previously recorded facial impression data if the impression-reporting message does not include an indication of the result of such a comparison, which may occur in some arrangements such as the arrangement depicted in FIGS. 2A-2B. If the newly received facial impression data matches previously recorded facial impression data that is associated with the media content item and taken by the operator, then the processing device 102 may prevent and/or otherwise block generation of an impression score and the process may end. If the newly received facial impression data does not match any previously recorded facial impression data that is associated with the media content item and taken by the operator, then the processing device 102 may proceed to step 342. If the impression-reporting message includes an indication of the result of the comparison, the processing server 102 may skip step 336.

At step 342, the processing server 102 may increment the counter if the impression-reporting message does not include a current value of the counter, which may occur in some arrangements such as the arrangement depicted in FIGS. 2A-2C. If the impression-reporting message includes a current value of the counter, the processing server 102 may skip step 342.

At step 344, the processing server 102 may generate an impression score based on the impression-reporting message and one or more impression score rules set by the user 114 for the viewed media content item. For example, the impression score may be based on the facial impression data and the location of the operator device 108 during consumption of the media content item by the viewer 112, and the time stamp of when the viewer 112 completed consumption of the media content item.

At step 346, the processing server 102 may transmit the impression score to the operator device 108 for display to the operator 110 at step 348. In some cases, an impression score is transmitted for each facial impression data. In some cases, an aggregate impression score may be generated based on one or more of the counter and a set of impression scores, which may be transmitted to the operator device 108 for display.

At step 350, the processing server 102 may, after waiting a preset period (e.g., 1 day, 2 weeks, 1 month, etc.), generate a report and transmit the report to the operator device 108 at step 352. At step 354, the operator device 108 may display the report to the operator 110. The report may include a list of impression scores and corresponding media content item identifiers, or any data included in an impression-reporting message. The reports may also be generated and transmitted to the operator device 108 on demand upon request by the operator 110.

At step 356, the processing server 102 may analyze the reports and transmit the analysis to the user device 106 at step 358. At step 360, the user device 106 may store the analysis. The analysis of the reports may be a summary of the reports over a particular time period, a particular metric for analyzing performance of the operator 110, or any other analysis performed on the data stored by the processing server 102.

Illustrative Method for Distributing Media Content and Tracking Impressions

Figure 4:
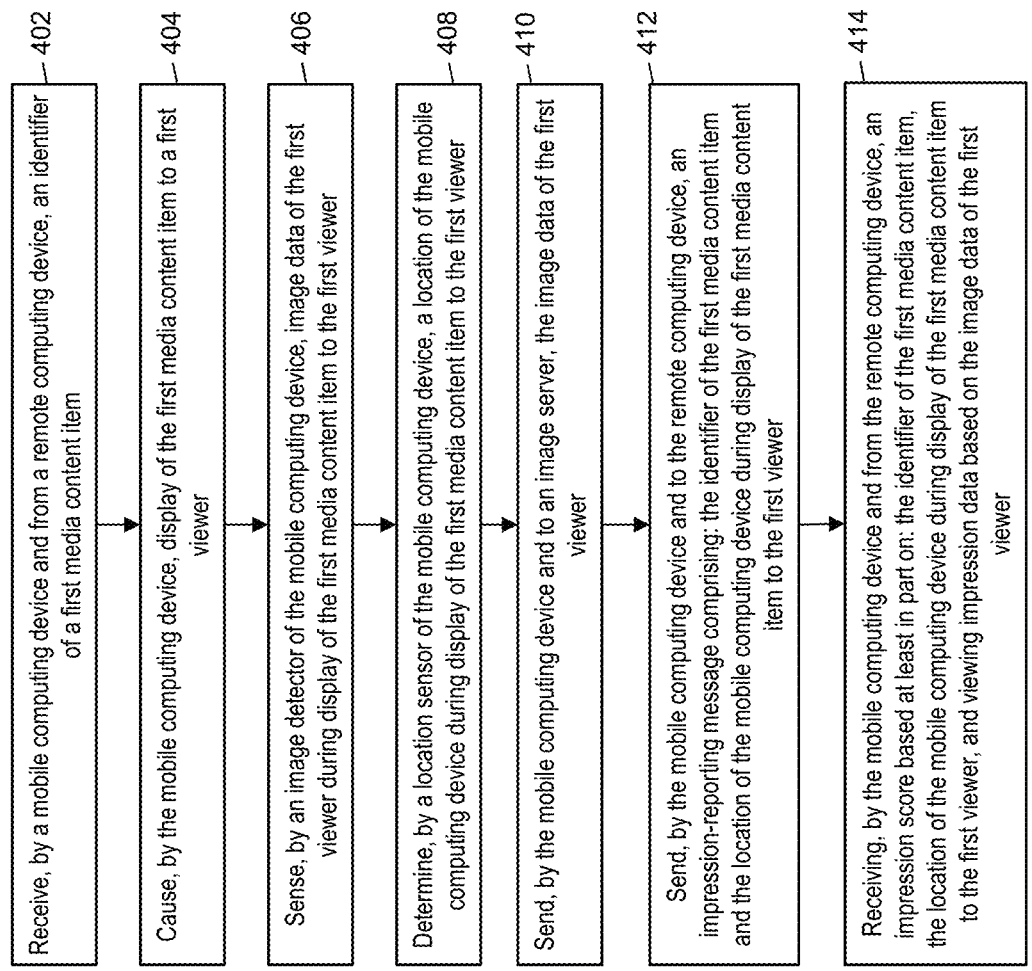
FIG. 4 is a flow chart depicting a method for distributing media content and tracking viewer impressions in accordance with illustrative embodiments.

FIG. 4 is a flow chart depicting a method for distributing media content and tracking viewer impressions in an out-of-home context in accordance with illustrative embodiments. The method may begin at step 402 in which the mobile computing device receives, from a remote computing device, an identifier of a first media content item. At step 404, the mobile computing device may cause display of the first media content item to a first viewer. At step 406, the mobile computing device may sense, by an image detector of the mobile computing device, image data of the first viewer during display of the first media content item to the first viewer. At step 408, the mobile computing device may determine, by a location sensor of the mobile computing device, a location of the mobile computing device during display of the first media content item to the first viewer. At step 410, the mobile computing device may send, to an image server, the image data of the first viewer. At step 412, the mobile computing device may send, to the remote computing device, an impression-reporting message that includes: the identifier of the first media content item and the location of the mobile computing device during display of the first media content item to the first viewer. At step 414, the mobile computing device may receive, from the remote computing device, an impression score based at least in part on: the identifier of the first media content item, the location of the mobile computing device during display of the first media content item to the first viewer, and viewing impression data based on the image data of the first viewer.

Illustrative Method for Distributing Media Content and Tracking Impressions

Figure 5:
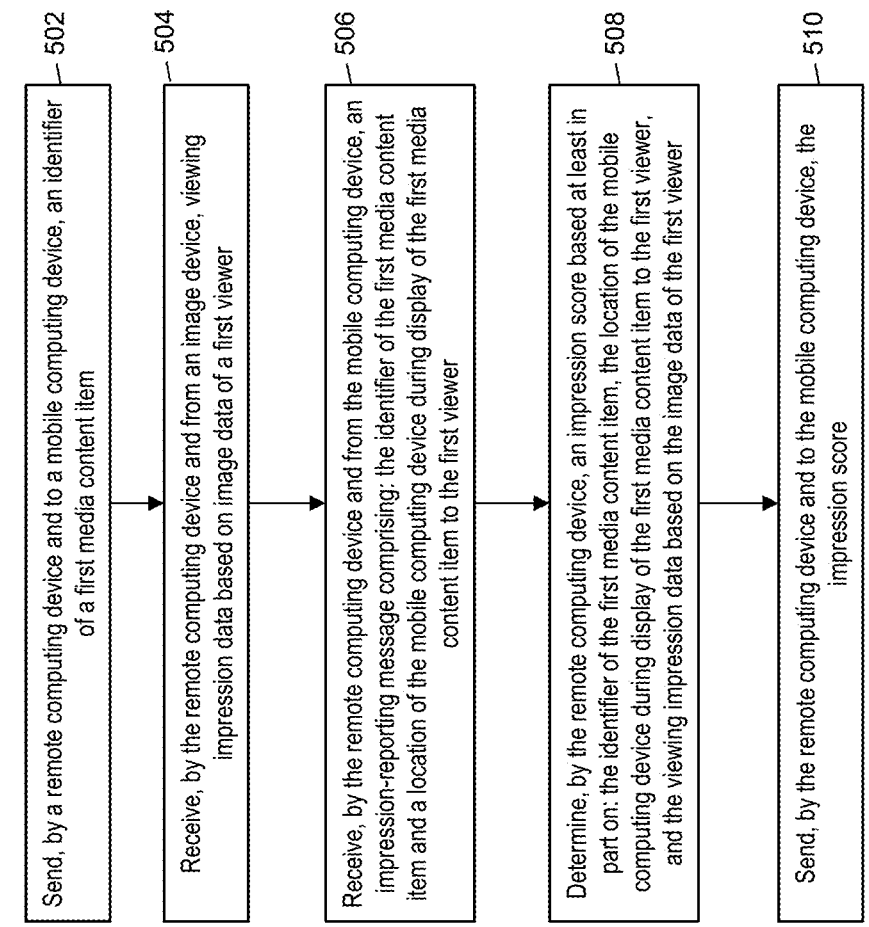
FIG. 5 is a flow chart depicting a method for distributing media content and tracking viewer impressions in accordance with illustrative embodiments.

FIG. 5 is a flow chart depicting a method for distributing media content and tracking viewer impressions in an out-of-home context in accordance with illustrative embodiments. The method may begin at step 502 in which a remote computing device may send, to a mobile computing device, an identifier of a first media content item. At step 504, the remote computing device may receive, from an image device, viewing impression data based on image data of a first viewer. At step 506, the remote computing device may receive, from the mobile computing device, an impression-reporting message. The impression-reporting message may include an identifier of the first media content item and a location of the mobile computing device during display of the first media content item to the first viewer. At step 508, the remote computing device may determine an impression score based at least in part on: the identifier of the first media content item, the location of the mobile computing device during display of the first media content item to the first viewer, and the viewing impression data based on the image data of the first viewer. At step 510, the remote computing device may send, to the mobile computing device, the impression score.

Computer System Architecture

Figure 6:
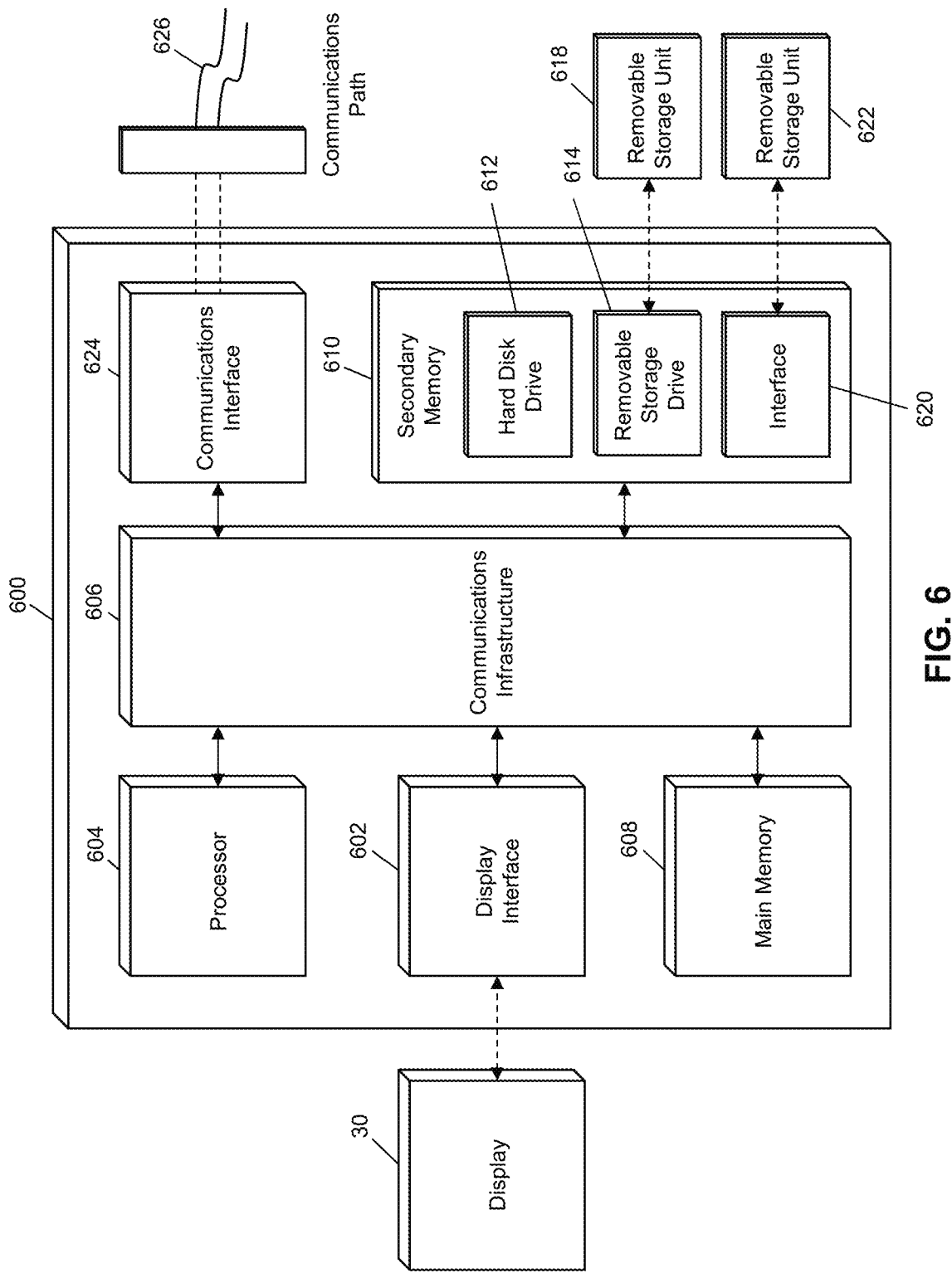
FIG. 6 is a block diagram depicting a computer system architecture in accordance with illustrative embodiments.

FIG. 6 illustrates a computer system 700 in which embodiments of the present disclosure, or portions thereof, may be implemented as computer-readable code. For example, one or more (e.g., each) of the processing server 102, user device 106, operator device 108, image server 116 and/or online video platform 104 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for distribution of media content and tracking of viewer impressions in an out-of-home context. While various illustrative embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method comprising:
receiving, by a mobile computing device and from a processing server, at least selections, as selected by a user of a remote computing device, of (i) one or more media content items, (ii) one or more corresponding geographic areas in which the one or more media content items are to be distributed, (iii) time frames in which the one more or more media content items are to be distributed, (iv) impression score rules, and (v) an identifier of the remote computing device;

causing, by the mobile computing device, display of a first media content item, of the one or more media content items, to a first viewer at the mobile computing device corresponding to the time frames, the impression score rules, and the one or more geographic areas;

generating, by the mobile computing device, a unique identifier associated with the display of the first media content item to the first viewer;

capturing, by an image detector of the mobile computing device, image data of the first viewer during the display of the first media content item to the first viewer, wherein said image data includes multiple images of the first viewer taken over a period of time;

determining, by a location sensor of the mobile computing device, a location of the mobile computing device during the display of the first media content item to the first viewer;

generating, by the mobile computing device, a timestamp at an end of playback of the first media content item;

sending, by the mobile computing device, the image data of the first viewer and the generated unique identifier, to an image server that analyzes the image data and generates facial impression data, wherein the image server is located remote from the mobile computing device and remote from the processing server;

blocking accessing the image data of the first viewer at the mobile computing device using a content distribution (CD) software application installed in the mobile computing device in order to maintain privacy of the first viewer;

upon sending the image data to the image server, removing, by the mobile computing device, the image data from memory that stored the image data;

receiving, by the mobile computing device, the facial impression data as generated by the image server based on analyzing the image data;

sending, by the mobile computing device and to the processing server, an impression-reporting message comprising:
an identifier of the first media content item,
the facial impression data,
the location of the mobile computing device during display of the first media content item to the first viewer,
the generated unique identifier associated with the display of the first media content item to the first viewer, and
the generated timestamp.

2. A method of claim 1, further comprising:
receiving, by the mobile computing device and from the processing server, an impression score based at least in part on:
the identifier of the first media content item,
the location of the mobile computing device during display of the first media content item to the first viewer, and
the facial impression data generated by the image server.

3. The method of claim 2, wherein the impression score is further based on the location of the mobile computing device during display of the first media content item to the first viewer being within a preset distance of a location of an entity associated with the first media content item.

4. The method of claim 1, wherein the facial impression data comprises a plurality of facial measurements of the first viewer, the method further comprising:
blocking, by the mobile computing device, sending of the image data of the first viewer to the remote computing device.

5. The method of claim 1, wherein the facial impression data received from the image server includes a plurality of facial measurements of the first viewer, and wherein the method further comprises:
determining, by the mobile computing device, whether the plurality of facial measurements of the first viewer matches any other set of facial measurements.

6. The method of claim 1, wherein the causing display of the first media content item comprises one of:

displaying, by a display component of the mobile computing device, the first media content item, or outputting, by the mobile computing device and to a remote display device, the first media content item and an instruction for the remote display device to display the first media content item.

7. A system comprising:
a mobile computing device including a processor, memory, image detector, and location sensor;
a processing server;
a remote computing device; and
image server,
wherein said mobile computing device is configured to:
receive, from the processing server, at least selections, as selected by a user of the remote computing device, of (i) one or more media content items, (ii) one or more corresponding geographic areas in which the one or more media content items are to be distributed, (iii) time frames in which the one more or more media content items are to be distributed, (iv) impression score rules, and (v) an identifier of the remote computing device;

cause display of a first media content item, of the one or more media content items to a first viewer at the mobile computing device corresponding to the time frames, the impression score rules, and the one or more geographic areas;

generate a unique identifier associated with the display of the first media content item to the first viewer;

capture, by the image detector, image data of the first viewer during the display of the first media content item to the first viewer, wherein said image data includes multiple images of the first viewer taken over a period of time;

determine, by the location sensor, a location of the mobile computing device during the display of the first media content item to the first viewer;

generate a timestamp at an end of playback of the first media content item;

send the image data of the first viewer and the generated unique identifier, to an image server that analyzes the image data and generates facial impression data, wherein the image server is located remote from the mobile computing device and remote from the processing server;

block accessing the image data of the first viewer at the mobile computing device using a content distribution (CD) software application installed in the mobile computing device in order to maintain privacy of the first viewer;

upon sending the image data to the image server, remove the image data from memory that stored the image data;

receive the facial impression data as generated by the image server based on analyzing the image data;

send, to the processing server, an impression-reporting message comprising:
an identifier of the first media content item,
the facial impression data,
the location of the mobile computing device during display of the first media content item to the first viewer,
the generated unique identifier associated with the display of the first media content item to the first viewer, and
the generated timestamp, wherein the processing server is configured to:

send, to the mobile computing device, the identifier of the first media content item,
receive, from the mobile computing device, the impression-reporting message, and
send, to the mobile computing device, an impression score.

8. The system of claim 7, wherein the mobile computing device is further configured to:
receive, from the processing server, the impression score based at least in part on:
the identifier of the first media content item,
the location of the mobile computing device during display of the first media content item to the first viewer, and
the facial impression data.

9. The system of claim 7, wherein the facial impression data comprises a plurality of facial measurements of the first viewer, and
wherein the mobile computing device is further configured to:
block sending of the image data of the first viewer to the remote computing device.

10. The system of claim 7, wherein the impression score is based on the location of the mobile computing device during display of the first media content item to the first viewer being within a preset distance of a location of an entity associated with the first media content item.

11. The system of claim 7, wherein the mobile computing device is configured to:
receive, from the image server, viewing impression data, wherein the viewing impression data comprises a plurality of facial measurements of the first viewer; and
determine whether the plurality of facial measurements of the first viewer matches any other set of facial measurements.

12. The system of claim 7, wherein the mobile computing device is configured to cause display of the first media content item by either:
displaying, by a display component of the mobile computing device, the first media content item, or
outputting, by the mobile computing device and to a remote display device, the first media content item and an instruction for the remote display device to display the first media content item.

13. A method comprising:
sending, by a processing server and to a mobile computing device, at least selections, as selected by a user of the remote computing device, of (i) one or more media content items, (ii) one or more corresponding geographic areas in which the one or more media content items are to be distributed, (iii) time frames in which the one more or more media content items are to be distributed, (iv) impression score rules, and (v) an identifier of the remote computing device;
causing, by the mobile computing device, display of a first media content item, of the one or more media content items, to a first viewer at the mobile computing device corresponding to the time frames, the impression score rules, and the one or more geographic areas;
generating, by the mobile computing device, a unique identifier associated with the display of the first media content item to the first viewer;
capturing, by an image detector of the mobile computing device, image data of the first viewer during the display of the first media content item to the first viewer, wherein said image data includes multiple images of the first viewer taken over a period of time;
determining, by a location sensor of the mobile computing device, a location of the mobile computing device during the display of the first media content item to the first viewer;
generating, by the mobile computing device, a timestamp at an end of playback of the first media content item;
sending, by the mobile computing device, the image data of the first viewer and the generated unique identifier, to an image server that analyzes the image data and generates facial impression data, wherein the image server is located remote from the mobile computing device and remote from the processing server;
blocking accessing the image data of the first viewer at the mobile computing device using a content distribution (CD) software application installed in the mobile computing device in order to maintain privacy of the first viewer;
upon sending the image data to the image server, removing, by the mobile computing device, the image data from memory that stored the image data;
receiving, by the by the mobile computing device and from the image server, the facial impression data;
receiving, by the processing server and from the mobile computing device, an impression-reporting message comprising:
an identifier of the first media content item,
the facial impression data,
the location of the mobile computing device during display of the first media content item to the first viewer,
the generated unique identifier associated with the display of the first media content item to the first viewer, and
the generated timestamp;
determining, by the processing server, an impression score based at least in part on:
the identifier of the first media content item,
the location of the mobile computing device during display of the first media content item to the first viewer, and
the facial impression data based on the image data of the first viewer; and
sending, by the processing server and to the mobile computing device, the impression score.

14. The method of claim 13, further comprising:
wherein the determining of the impression score is further based on the generated timestamp being within a time period set by a user associated with the first media content item.

15. The method of claim 13, wherein the impression score is based on the location of the mobile computing device during display of the first media content item to the first viewer being within a preset distance of a location of an entity associated with the first media content item.

16. The method of claim 13, wherein the facial impression data comprises a plurality of facial measurements, the method further comprising:
determining, by the processing server, whether the plurality of facial measurements of the first viewer matches any other set of facial measurements.

17. A system comprising:
a remote computing device;
a mobile computing device; and
a processing server, wherein the processing server is configured to:
send, to a mobile computing device, at least selections, as selected by a user of the remote computing device, of (i) one or more media content items, (ii) one or more corresponding geographic areas in which the one or more media content items are to be distributed, (iii) time frames in which the one more or more media content items are to be distributed, (iv) impression score rules, and (v) an identifier of the remote computing device;

the mobile computing device is configured to:

receive the at least selections, cause display of a first media content item, of the one or more media content items to a first viewer at the mobile computing device corresponding to the time frames, the impression score rules, and the one or more geographic areas, generate a unique identifier associated with the display of the first media content item to the first viewer, capture, by an image detector, image data of the first viewer during the display of the first media content item to the first viewer, wherein said image data includes multiple images of the first viewer taken over a period of time, determine, by a location sensor, a location of the mobile computing device during the display of the first media content item to the first viewer, generate a timestamp at an end of playback of the first media content item, send the image data of the first viewer and the generated unique identifier, to an image server that analyzes the image data and generates facial impression data, wherein the image server is located remote from the mobile computing device and remote from the processing server, block accessing the image data of the first viewer at the mobile computing device using a content distribution (CD) software application installed in the mobile computing device in order to maintain privacy of the first viewer, upon sending the image data to the image server, remove the image data from memory that stored the image data, and receive, from the image server, facial impression data;

wherein the processing server is further configured to:

receive, from the mobile computing device, an impression-reporting message comprising:

the generated unique identifier of the first media content item, the facial impression data generated by the image server, and the location of the mobile computing device during display of the first media content item to the first viewer, and the generated unique identifier associated with the display of the first media content item to the first viewer, determine, an impression score based at least in part on:

the generated unique identifier of the first media content item, the location of the mobile computing device during display of the first media content item to the first viewer, the facial impression data based on the image data of the first viewer, and the generated timestamp, and send, to the mobile computing device, the impression score.

18. The system of claim 17, wherein the determining of the impression score is based on the generated timestamp being within a time period set by a user associated with the first media content item.

19. The system of claim 17, wherein the impression score is based on the location of the mobile computing device during display of the first media content item to the first viewer being within a preset distance of a location of an entity associated with the first media content item.

20. The system of claim 17, wherein the facial impression data comprises a plurality of facial measurements, and wherein the processing server is configured to:

determine whether the plurality of facial measurements of the first viewer matches any other set of facial measurements.

* * * * *